US008029176B2

(12) United States Patent
Shih

(10) Patent No.: US 8,029,176 B2
(45) Date of Patent: Oct. 4, 2011

(54) VEHICLE HEADLIGHT CAPABLE OF COMPENSATING FOR LIGHT INTENSITY OF DARK REGION

(75) Inventor: Ming-Jhih Shih, Tainan (TW)

(73) Assignee: TYC Brother Industrial Co., Ltd., Tainan (TW)

( * ) Notice: Subject to any disclaimer, the term of this patent is extended or adjusted under 35 U.S.C. 154(b) by 312 days.

(21) Appl. No.: 12/468,335

(22) Filed: May 19, 2009

(65) Prior Publication Data

US 2009/0303741 A1 Dec. 10, 2009

(30) Foreign Application Priority Data

Jun. 6, 2008 (TW) .............................. 97121186 A

(51) Int. Cl.
*B60Q 1/00* (2006.01)

(52) U.S. Cl. ...................................... 362/539; 362/511

(58) Field of Classification Search .................. 362/511, 362/538–539

See application file for complete search history.

(56) References Cited

U.S. PATENT DOCUMENTS 5,307,247 A * 4/1994 Cejnek .......................... 362/539
7,722,233 B2 * 5/2010 Meyrenaud .................. 362/539
7,789,545 B2 * 9/2010 Cheng et al. ................ 362/539

* cited by examiner

*Primary Examiner* — Jason Moon Han
*Assistant Examiner* — Sean Gramling
(74) *Attorney, Agent, or Firm* — WPAT, P.C.; Anthony King

(57) ABSTRACT

A vehicle headlight capable of compensating for light intensity of a dark region includes a lamp holder, a light source, a light shield, and a light guide. The lamp holder defines an accommodation space, and includes a reflector and a lens disposed on a front side of the reflector. The light source is installed in the accommodation space and disposed along an optical axis, and light rays emitted from the light source are refracted by the lens and emitted forwards. The light shield is assembled on the lamp holder and located between the light source and the lens, and the light shield is used to shield some of the light rays emitted from the light source. The light guide conducts some of the light rays towards the lens, such that the light rays are emitted forwards and upwards, thereby compensating for the light intensity of the dark region above the optical axis.

7 Claims, 7 Drawing Sheets
(2 of 7 Drawing Sheet(s) Filed in Color)

VEHICLE HEADLIGHT CAPABLE OF COMPENSATING FOR LIGHT INTENSITY OF DARK REGION

BACKGROUND OF THE INVENTION

1. Field of the Invention

The present invention relates to a vehicle headlight, and more particularly to a poly-ellipsoid system (PES) vehicle headlight capable of compensating for light intensity of a dark region.

2. Description of the Related Art

When vehicles run on the road, to accommodate different traffic situations and visual demands, vehicle headlights may be classified into high-beam headlights, low-beam headlights, and vehicle headlights capable of being switched between the high-beam headlight and the low-beam headlight, and recently the design applied to the vehicle headlight is called a poly-ellipsoid system (PES) vehicle headlight. Referring to FIG. 1, it is a PES vehicle headlight serving as the low-beam headlight. The PES vehicle headlight includes a reflector 61 defining an accommodation space 610, a light source 62 installed in the accommodation space 610 and disposed along a horizontal optical axis X, a light shield 63 extending upwards from a bottom edge of the reflector 61 and having a top edge height the same as an optical axis X, a shell (not shown) assembled on a front side of the reflector 61, and a lens 64 installed on the shell. Light rays emitted from the light source 62 are reflected by the reflector 61 and shielded by the light shield 63, such that after passing through the lens 64, the light rays are mainly emitted horizontally or slightly downwards towards the region under the optical axis X, thereby achieving effects of the low-beam headlight. Although the vehicle headlight may be used as the low-beam headlight, the light rays are mainly scattered in a region under the optical axis X, such that the region above the optical axis X has an insufficient light intensity, and thus the region is hereafter referred to as a dark region. Generally, the light intensity of the dark region approximately more than 18 meters in front of the vehicle headlight should be at least 64 candelas (cd), but the dark region of the conventional vehicle headlight has distinctly insufficient light intensity, such that when driving the vehicle at night, the driver cannot clearly read traffic signs disposed on higher positions on the road.

Referring to FIG. 6, it is a distribution view of a light field of a position 25 meters in front of the light source 62 of the conventional vehicle headlight. In the diagram, a horizontal axis represents the horizontal angles of the left and right sides at the position 25 meters in front of the light source 62 serving as a center, a left vertical axis represents upper and lower angles, and bottom graduations represent the light intensity represented by each line (in a unit of cd). It can be obtained from FIG. 6 that the dark region has nearly no light rays, such that the light intensity value thereof cannot meet the requirements of the rules.

The insufficient light intensity in the dark region may affect safety during driving, so recently many designs for compensating for the light intensity in the dark region of the low-beam headlight were proposed. Referring to FIG. 2, for example, in U.S. Pat. No. 6,736,533, in the vehicle headlight of the prior art, an auxiliary shielding board 72 is added on a front side of a light shield 71, and the auxiliary shielding board 72 may reflect a part of the light rays emitted downwards, such that after passing through the lens 73, the light rays form compensation light rays A1 refracted upwards and are emitted, thereby compensating for the light intensity in the dark region. Referring to FIG. 3, in the US patent, a perforation 810 is opened on a light shield 81, and an auxiliary shielding board 82 is disposed on an inner side of the light shield 81, such that light intensity in the dark region is compensated through the modified structures.

On the other hand, some vehicle headlights can be switched between the high-beam headlight and the low-beam headlight, in which case, an electromagnetic valve is used to drive a modulatable light shield to rotate, thereby changing an outward projecting path of the light rays, so as to switch between the high-beam headlight and the low-beam headlight. However, the light shield 71 and the auxiliary shielding board 72 are combined in a link-up manner, and the perforation 810 is disposed on the light shield 81. The structural modification of the light shields 71 and 81 may compensate for light intensity of the dark region, but the demands of the high-beam headlight cannot be met. Therefore, the above design for compensating for light intensity in the dark region is applied to only the low-beam headlight, and cannot be applied to the vehicle headlight capable of being switched between the high-beam headlight and the low-beam headlight. Therefore, the design applicability is poor, and needs to be modified.

In addition, in U.S. Pat. No. 6,494,603, the light shield disposed in front of the light source is used to compensate for light intensity of the dark region, but the light shield and a supporting case are integrally formed by casting. During casting, the accuracy must be improved; otherwise, after the light shield is shaped, the disposition angle easily generates deviation, such that the light rays cannot be reflected to a preset direction. Moreover, the design cannot be applied to the vehicle headlight capable of being switched between the high-beam headlight and the low-beam headlight.

SUMMARY OF THE INVENTION

The present invention is directed to a vehicle headlight, having a simple light guide structure and a better applicability, and capable of compensating for light intensity in a dark region.

The present invention provides a vehicle headlight capable of compensating for light intensity in a dark region, which includes a lamp holder, a light source, a light shield, and a light guide. The lamp holder includes a reflector, a case attached to a front side of the reflector and defining an accommodation space together with the reflector, and a lens installed on a front side of the case. The light source is installed in the accommodation space and disposed along an optical axis, and light rays emitted from the light source are refracted by the lens and emitted forwards.

The light shield is assembled on the lamp holder and located between the light source and the lens, and the light shield is used to shield some of the light rays emitted from the light source. The light guide is disposed in the accommodation space and located between the light shield and the lens, and has a light incident surface facing the light shield and a light exit surface facing the lens. The light exit surface increasingly extends backwards from top to bottom. The light guide conducts the light rays from the light source towards the lens, such that the light rays conducted from the lens are emitted forwards and upwards.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

A detailed description of the above and other technical contents, features, and efficacies of the present invention is given as follows with accompanying drawings and a preferred embodiment.

Figure 1:
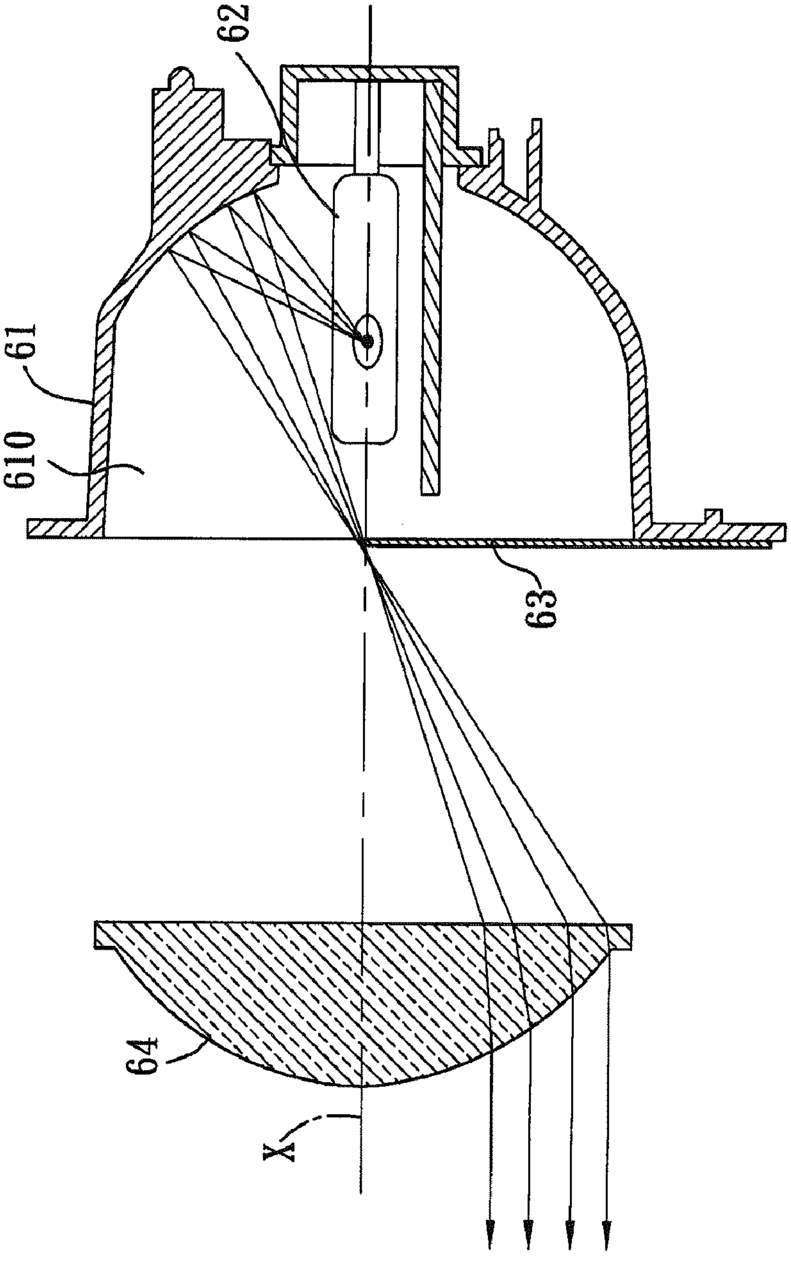
FIG. 1 (Prior Art)
FIG. 1 is a cross-sectional side view of a conventional vehicle headlight.
Figure 2:
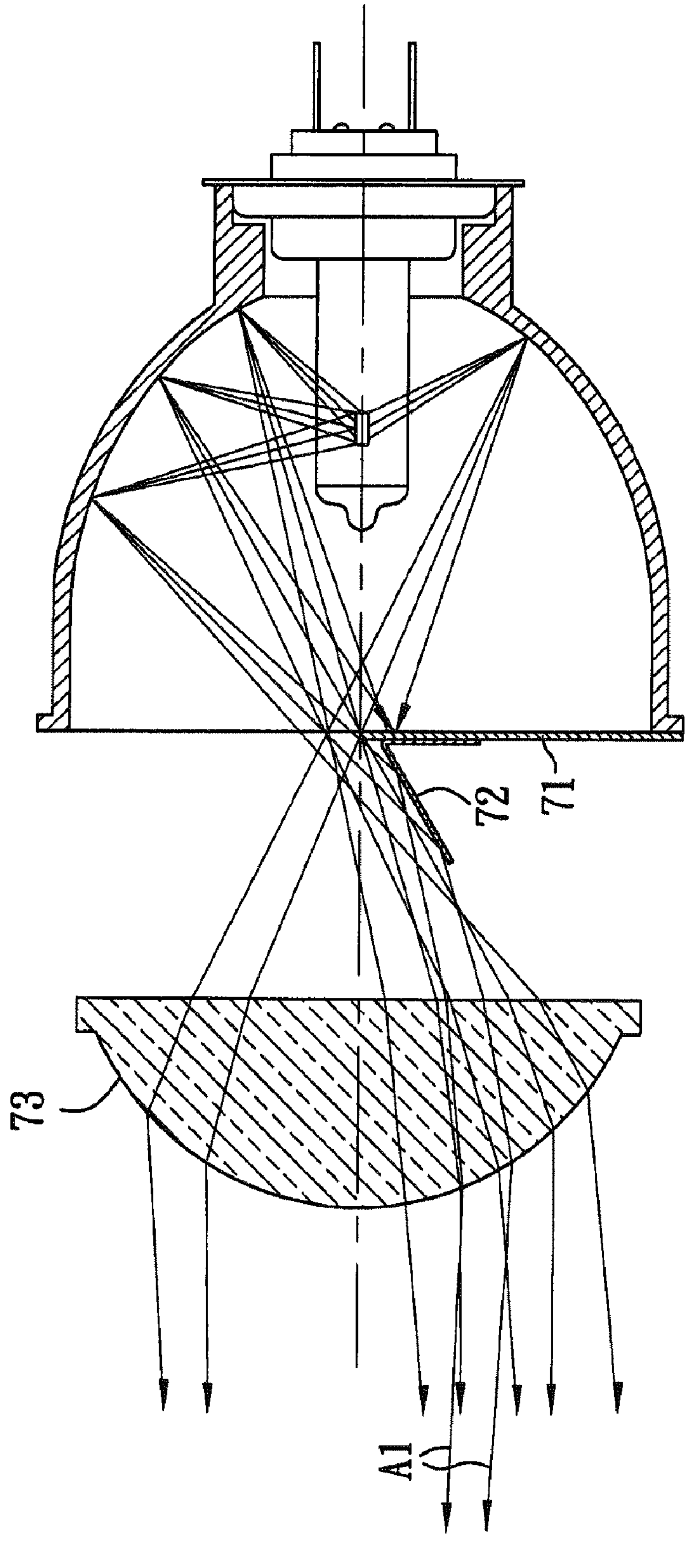
FIG. 2 (Prior Art)
FIG. 2 is a cross-sectional side view of a vehicle headlight in the prior art of U.S. Pat. No. 6,736,533.
Figure 3:
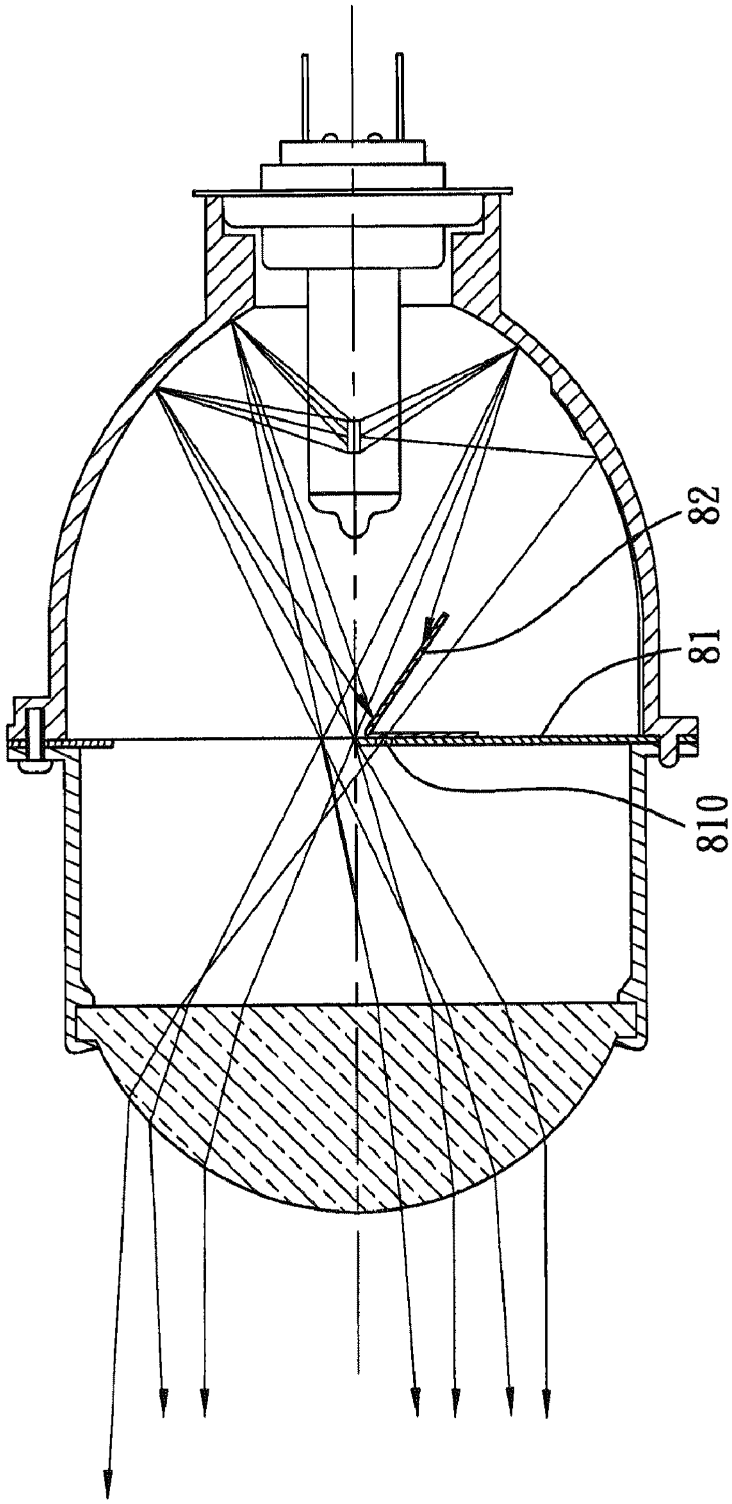
FIG. 3 (Prior Art)
FIG. 3 is a cross-sectional side view of a vehicle headlight according to U.S. Pat. No. 6,736,533.
Figure 4:
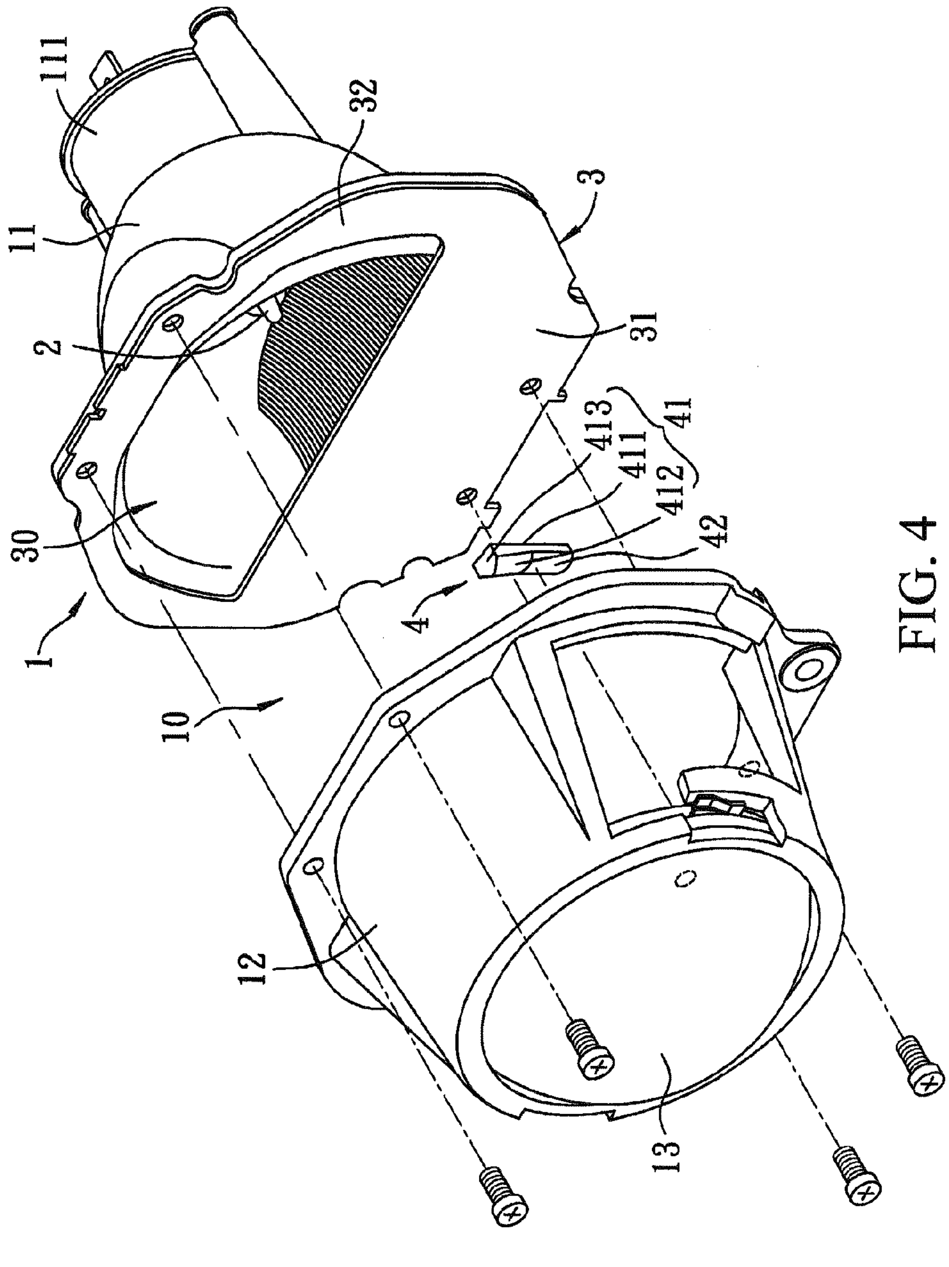
FIG. 4 is a three-dimensional exploded view of a vehicle headlight capable of compensating for light intensity in a dark region according to a preferred embodiment of the present invention.
Figure 5:
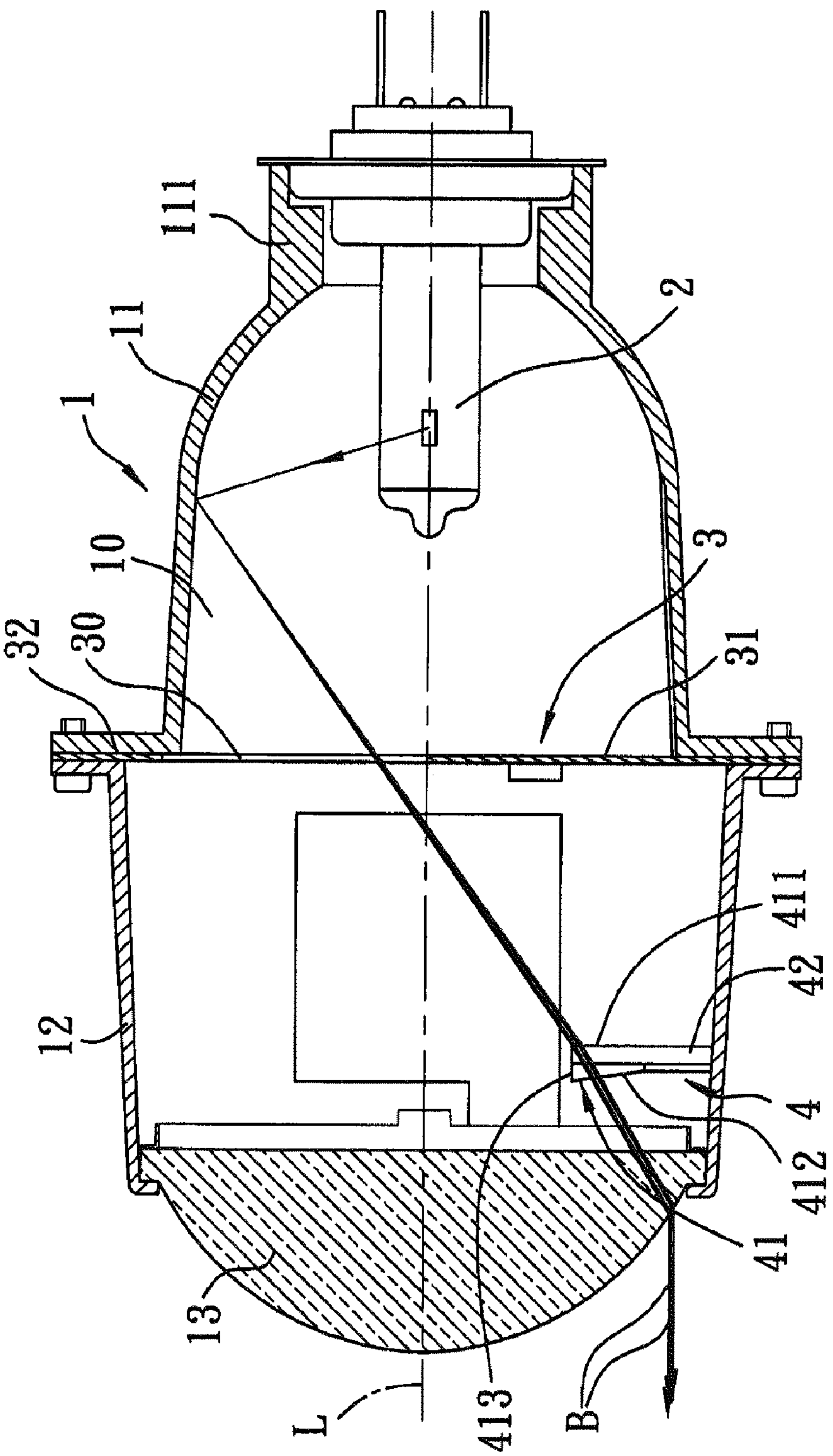
FIG. 5 is a cross-sectional side view showing a light track of some of the light rays emitted from a light source according to the preferred embodiment.
Figure 6:
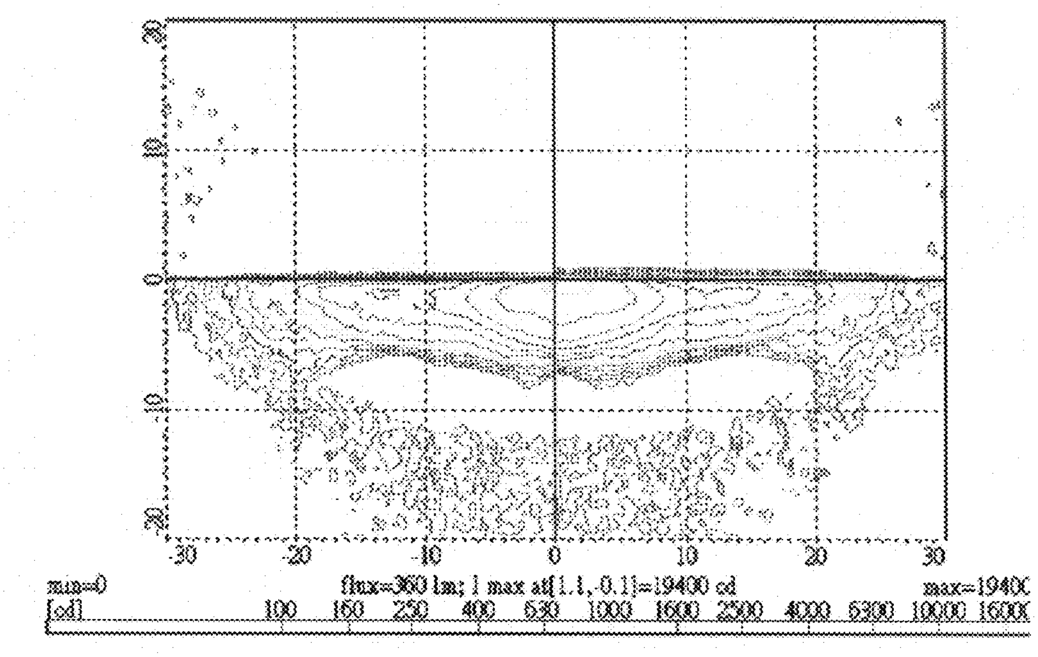
FIG. 6 (Prior Art)
FIG. 6 is a distribution diagram of a light field of a position 25 meters in front of a light source of a conventional vehicle headlight.

Referring to FIGS. 4 and 5, a vehicle headlight capable of compensating for light intensity in a dark region according to the preferred embodiment of the present invention is used as a low-beam headlight, and includes a lamp holder 1, a light source 2 installed in the lamp holder 1, a light shield 3, and a light guide 4.

The lamp holder 1 includes a reflector 11, a case 12 and a lens 13. The reflector 11 surrounds a horizontally extending optical axis L and has a light emission installing portion 111 installed on a back side of the reflector 11. The case 12 is screwed on a front side of the reflector 11 and defines an accommodation space 10 together with the reflector 11. The lens 13 is installed on a front side of the case 12. The lens 13 is assembled on the case 12 and is located in front of the light source 2, and refracts the light rays emitted from the light source 2, such that the light rays are emitted forwards. The light source 2 is installed on the light emission installing portion 111 and extends towards the accommodation space 10, and a central position of the light source 2 is located on the optical axis L.

A peripheral profile of the light shield 3 is designed to match the reflector 11, and is screwed between the reflector 11 and the case 12. The light shield 3 includes a light shielding portion 31 and a connection portion 32. The light shielding portion 31 is located on a lower part. The connection portion 32 extends upwards from left and right sides of the light shielding portion 31 and defines a light transmissive space 30 together with the light shielding portion 31. The light shield 3 is used to shield a part of the light rays emitted from the light source 2.

The light guide 4 may be made of glass, polyethersulfone (PES), Indium Tin oxide (ITO), polyvinyl chloride (PVC) material, or other light transmissive materials. In order to prevent the light guide 4 from being affected by the heat energy of the light source 2, the light guide 4 is made of a material with excellent heat resistance. The light guide 4 is located between the light shield 3 and the lens 13, and includes a light transmissive portion 41 and a base 42. The light transmissive portion 41 is located on an upper part thereof. The base 42 extends downwards from the light transmissive portion 41 and connected to the case 12.

Some of the light rays emitted from the light source 2 are emitted forwards through the light transmissive portion 41. The light transmissive portion 41 has a light incident surface 411, a light exit surface 412 and a top surface 413. The light incident surface 411 faces the light shield 3. The light exit surface 412 inversely is spaced from the light incident surface 411 and faces the lens 13. The top surface 413 connects to the upper parts of the light incident surface 411 and the light exit surface 412 and has a height lower than the optical axis L. The light incident surface 411 is a plane vertically extending from top to bottom. The light exit surface 412 protrudes in an arc from left and right sides to a center, and increasingly obliquely extends backwards from top to bottom, such that from a side view, the light transmissive portion 41 assumes an appearance of having a top wider than the bottom. The base 42 is used to fix the light transmissive portion 41 to an inner surface of a bottom of the case 12.

In the present invention, while in use, the light rays emitted from the light source 2 are reflected by the reflector 11, and some of the light rays which are emitted upwards from the light source 2 are emitted from the light transmissive space 30 after being reflected by the reflector 11, and are refracted by the lens 13 to project under the optical axis L to create the effects of the low-beam headlight. Some of the light rays are incident towards the light incident surface 411 of the light guide 4, pass through the light exit surface 412, and are refracted by the lens 13 to form a compensation light ray B to travel upwards, and the compensation light ray B may be projected to the dark region approximately 25 meters in front of the light source 2, such that the dark region becomes brighter.

Figure 7:
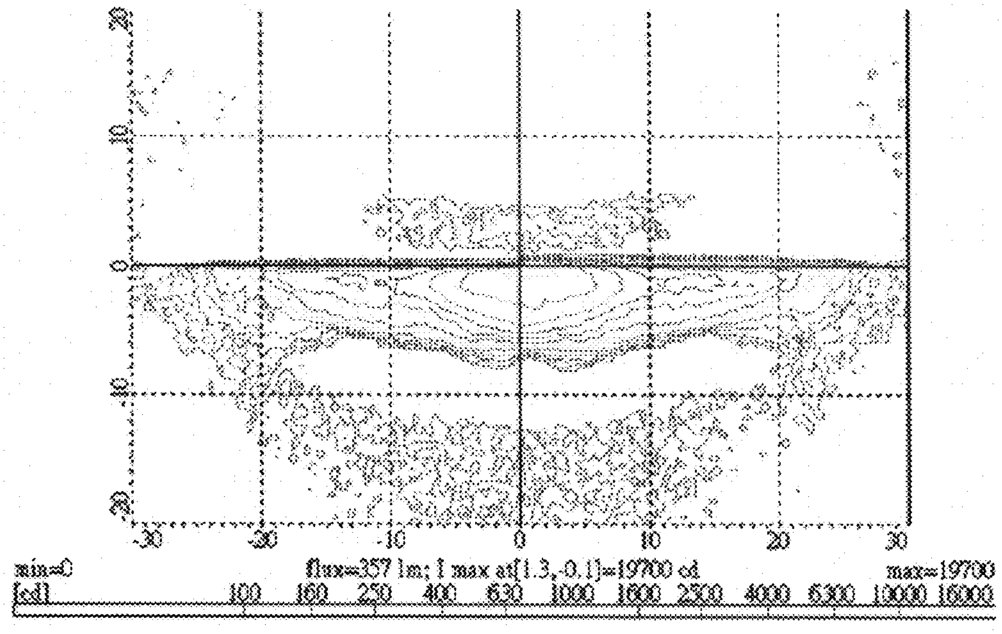
FIG. 7 is a distribution diagram of a light field of a position 25 meters in front of a light source according to a preferred embodiment of the present invention.

Referring to FIG. 7, it is a distribution diagram of a light field of a position 25 meters in front of the light source according to the preferred embodiment of the present invention. In the diagram, a horizontal axis represents the horizontal angles of the left and right sides at the position 25 meters in front of the light source 2 serving as a center, a left vertical axis represents upper and lower angles, and bottom graduations represent the light intensity represented by each line (in a unit of cd). The light intensity of the above dark region (the region with a value on the vertical axis above 0 degrees) is distinctly raised, and at least reaches above 100 cd.

To sum up, through the refraction effect of the light exit surface 412, the light rays passing through the light exit surface 412 and traveling towards the lens 13 are refracted upwards, such that with the changes of the upper and lower thickness, the light transmissive portion 41 controls the light rays, causing them to refract upwards, and the light exit surface 412 increasingly protrudes in an arc forwards from the left and right sides to the center, so the light rays which are emitted forwards cover the adequate area in the left and right directions. Therefore, in the present invention, with the structural design of the light guide 4 and the refraction effect of the lens 13, the light intensity in the dark region is compensated indeed. The structure of the light guide 4 is simple, and the disposition position does not interfere with the light shield 3. In this embodiment, although the vehicle headlight is, for example, the low-beam headlight, during implementation, an electromagnetic valve is added to drive the light shield 3 to rotate, and the rotation of the light shield 3 is not affected by the light guide 4, such that the present invention is also applicable to the vehicle headlight capable of being switched between the high-beam headlight and the low-beam headlight, and has wide applicability.

While the embodiment of the present invention have been illustrated and described, various modifications and improvements can be made by those skilled in the art. The embodiments of the present invention are therefore described in an illustrative but not restrictive sense. It is intended that the present invention may not be limited to the particular forms as illustrated, and that all modifications that maintain the spirit and scope of the present invention are within the scope as defined in the appended claims.

What is claimed is:

1. A vehicle headlight capable of compensating for light intensity in a dark region, comprising:

a lamp holder, comprising a reflector, a case and a lens, the case attached to the front side of the reflector and defining an accommodation space together with the reflector, and the lens installed on the front side of the case;

a light source, installed in the accommodation space and disposed along an optical axis, wherein light rays emitted from the light source are refracted by the lens and emitted forwards;

a light shield, assembled on the lamp holder, located between the light source and the lens, and used to shield a part of the light rays emitted from the light source; and a light guide having a light transmissive portion, disposed in the accommodation space and located between the light shield and the lens, the light transmissive portion having a light incident surface and a light exit surface, the light incident surface facing the light shield, and the light exit surface facing the lens, wherein the light exit surface increasingly extends backwards from top to bottom, and the light transmissive portion conducts the light rays from the light source towards the lens, such that the light rays conducted from the lens are emitted forwards and upwards.

2. The vehicle headlight capable of compensating for light intensity in a dark region according to claim 1, wherein the light exit surface increasingly protrudes in an arc from left and right sides to a center.

3. The vehicle headlight capable of compensating for light intensity in a dark region according to claim 1, wherein the light guide further comprises a base, the light transmissive portion is located on an upper part, the base extends downwards from the light transmissive portion and connects to the case, and the light transmissive portion has the light incident surface and the light exit surface.

4. The vehicle headlight capable of compensating for light intensity in a dark region according to claim 1, wherein the light incident surface is a plane vertically extending from top to bottom.

5. The vehicle headlight capable of compensating for light intensity in a dark region according to claim 2, wherein the light incident surface is a plane vertically extending from top to bottom.

6. The vehicle headlight capable of compensating for light intensity in a dark region according to claim 3, wherein the light incident surface is a plane vertically extending from top to bottom.

7. The vehicle headlight capable of compensating for light intensity in a dark region according to claim 1, wherein the light guide is made of glass, polyethersulfone (PES), Indium Tin oxide (ITO), or polyvinyl chloride (PVC).

* * * * *